Feb. 5, 1957

W. T. FLEMING 2,780,433

VALVE

Filed April 27, 1953

INVENTOR.
William T. Fleming
BY
J. William Carson
ATTORNEY

Feb. 5, 1957  W. T. FLEMING  2,780,433
VALVE
Filed April 27, 1953  2 Sheets-Sheet 2

VALVE CLOSED

VALVE OPENING

VALVE CLOSING

VALVE CLOSED

INVENTOR.
William T. Fleming
BY
J. William Carson
ATTORNEY

United States Patent Office 2,780,433
Patented Feb. 5, 1957

2,780,433

VALVE

William T. Fleming, West Orange, N. J., assignor to Specialties Development Corporation, Belleville, N. J., a corporation of New Jersey Application April 27, 1953, Serial No. 351,333

13 Claims. (Cl. 251—70)

This invention relates to valves, and, more particularly, to improvements in seat type, solenoid actuated valves.

Heretofore, seat type valves have been proposed wherein a valve member was held either on or off its seat by a spring and was held in the position opposite these positions by a solenoid actuated mechanism, thus requiring constant energization of the solenoid when acting to hold the valve member in a position in opposition to the spring. Prolonged energization of the solenoid consumed power, caused heating of the solenoid, and reduced the serviceable life thereof. Also, in the event of a power failure while the solenoid was energized, the spring would move the valve member to its opposite position whereby flow through the valve was unintentionally interrupted or permitted which could cause difficulties or serious consequences and faulty operation of the systems in which such values were utilized.

Attempts have been made to overcome the foregoing disadvantages with the result that the valves became slow acting and that the valve operating mechanism became too bulky and complicated.

Accordingly, an object of the present invention is to provide a seat type valve actuated by a solenoid or the mechanical equivalent thereof which overcomes the foregoing difficulties and disadvantages.

Another object is to provide such a valve which is extremely quick acting.

Another object is to provide such a valve which is locked automatically in opened and closed position without continuous energization of the solenoid whereby its position will not change in the event of a power failure.

Another object is to provide such a valve which is unaffected by the pressure of the fluid flowing therethrough.

Another object is to provide such a valve which requires only a small amount of power for its actuation and which requires no power to maintain it in either its opened or closed position.

A further object is to provide such a valve which is simple, compact and rugged in construction, economical to manufacture and reliable in its operation.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, the foregoing objects may be accomplished by providing a valve comprising a body having a bore, an inlet, an outlet, and a valve seat between the inlet and the outlet; a valve member for the seat; a plunger slidably disposed in the bore and connected to the valve member and having a slot therein; means for moving the plunger to effect movement of the valve member with respect to its seat; stop means in the bore; an element movably mounted on the plunger for engaging the stop means to lock said plunger in a predetermined position; actuating means including a member slidably mounted in the slot; and means carried by the last mentioned member for operating the element to engage and release the stop means.

More specifically, the element mounted on the plunger for engaging the stop means to lock the plunger may comprise a latch element pivotally mounted on the plunger having a cam surface and a projection for engaging the stop means. The means carried by the member slidably mounted in the plunger slot may comprise a latch operating element pivotally mounted on the member and having a projection for engaging the cam surface of the latch element to operate the same to engage and release the stop means. The stop means may comprise a ring having a pair of shoulders mounted in the bore of the valve body.

A preferred embodiment of the invention has been chosen for purposes of illustration and description, and is shown in the accompanying drawings, forming a part of the specification, wherein.

Figure 1:
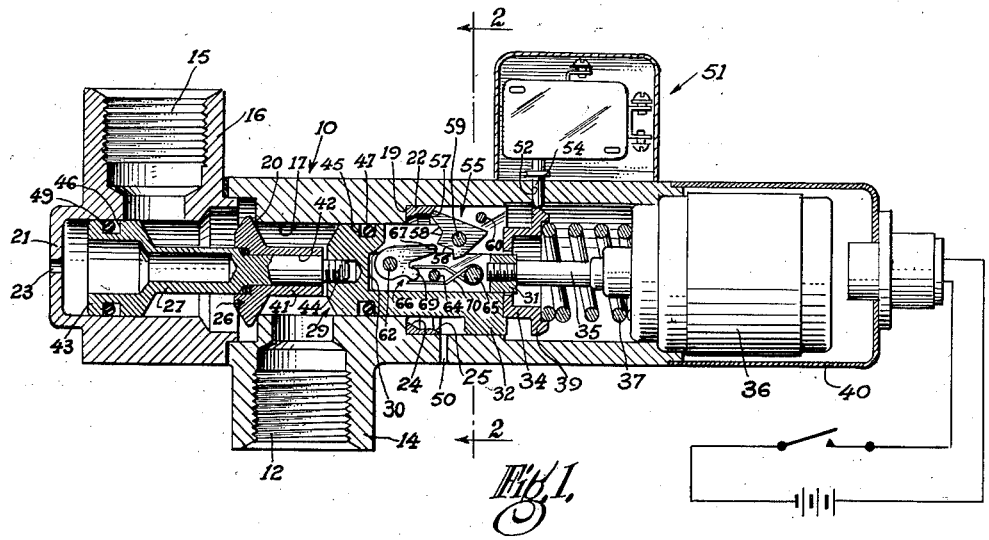
Fig. 1 is a longitudinal sectional view of a valve in accordance with the present invention.
Figure 2:
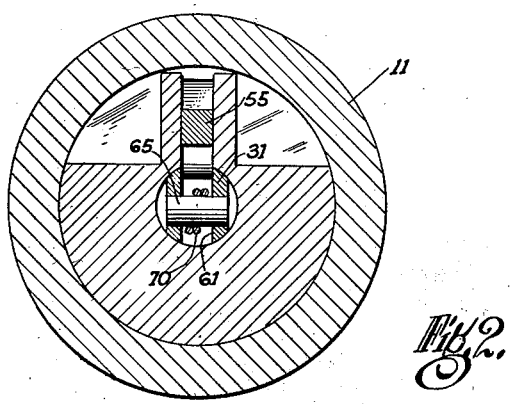
Fig. 2 is an enlarged sectional view taken substantially along line 2—2 on Fig. 1.

Referring to the drawings in detail, and more particularly to Figs. 1 and 2 thereof, there is shown a valve 10 having a valve body 11 provided with an inlet 12 formed in an inlet nipple 14, an outlet 15 formed in an outlet nipple 16, and a longitudinal bore 17 in communication with the inlet and outlet and formed with a shoulder 19, a valve seat 20 between the inlet and the outlet and an end wall 21 adjacent the outlet provided with a vent opening 23. An annular ring 22 having a pair of shoulders 24 and 25 is seated on the shoulder 19.

The flow of fluid medium through the valve from the inlet to the outlet is controlled by a valve member 26 for the seat 20. The valve member is mounted on a shaft 27 which extends longitudinally in the bore 17 and is connected at one end to a plunger 29 slidably disposed in the bore. The plunger is provided with a slot 30, and a rod 31 is slidably mounted in this slot. The rod extends slightly beyond an enlarged end portion 32 of the plunger and through an aperture in the base of a cup-shaped disc 34, and the enlarged end portion 32 of the plunger abuts the base of the disc. A stem 35 has one end connected to the rod 31 and has its other end connected to the armature (not shown) of a solenoid 36, the operation of which will be described hereinafter. A helical spring 37 is mounted around the stem 35 and bears against the solenoid housing at one end and against a flanged rim 39 of the disc 34 at the other end and thus tends to urge the plunger 29 in a direction to effect unseating of the valve member 26.

The solenoid 36 is mounted in the end of the valve body and serves as a closure for the bore 17. If desired, a cap member 40 having a suitable electrical connector may be mounted on the valve body to cover and protect the solenoid.

The valve member 26 is formed with a sleeve portion 41 having a bore 42 through which the shaft 27 extends in which the shaft is secured. At a point adjacent the end wall 21, an enlarged head 43, suitable for sliding movement in the bore 17, is secured to the shaft which cooperates with the bore to provide dash-pot means. The other end of the shaft is provided with an extension 44 of reduced diameter which is connected to the inner end of the plunger 29.

Preferably, the effective area of the valve member 26, the plunger 29 and the enlarged head section 43, are substantially equal, as shown in Fig. 1, so that the valve is balanced in either the opened or the closed position and the pressure of the fluid to be controlled will have no effect upon the opening or closing operation.

The end of the plunger 29 adjacent the valve member and the enlarged head 43 are provided with annular grooves 45 and 46, respectively, in which are mounted annular sealing rings 47 and 49, respectively, to provide seals between the ends of the bore and the zone of the bore between its inlet and outlet. In the event fluid leaks past the plunger 29 or the head 43, it may escape through a vent 50 or the opening 23 provided for such purpose.

An electrical microswitch 51 of the single-pole double-throw type is mounted at the exterior of the valve body adjacent an aperture 52 therein adapted to receive a movable pin member 54 of the switch which extends into the bore 17 and is engaged by flanged rim 39 of the disc 34 to actuate the switch in a manner to be described hereinafter.

In order to enable the valve to lock itself in either the opened or closed position, the plunger 29 is provided with a latch element 55, having a pair of cam surfaces 56 and 58 and a projection 57, pivotally mounted in the slot 30 on a pin 59 which extends across the slot and is mounted at each of its ends in the plunger body. A second similarly mounted pin 60 serves to limit the movement of the latch member.

The rod 31 is also provided with a slot 61 across which are mounted three pins 62, 64 and 65 having their ends secured in apertures in the rod at each side of the slot 61 provided for that purpose. A latch operating element 66, having a projection 67 and a second projection or toe portion 69 is pivotally mounted on the pin 62.

A two-way forked spring 70 is looped about the pin 65 and has each of its ends bearing against the toe portion 69 of the element 66, wherefore the spring tends to maintain the element 66 in the position shown in Fig. 1. The pin 64 is located between the ends of the spring and serves to maintain one end thereof in position when the other end is biased away from the pin 64 by movement of the toe portion 69 upon pivotal movement of the element about the pin 62.

Figure 3:
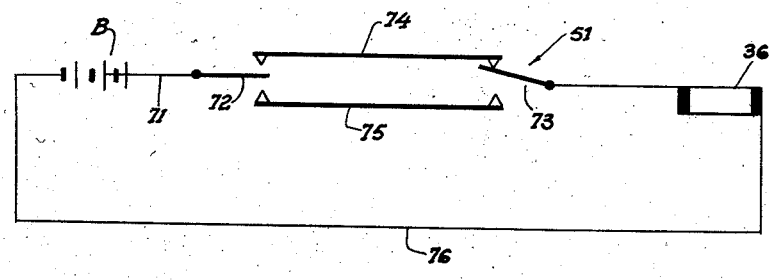
Fig. 3 is a diagrammatic view of a circuit in which the valve is connected.

As shown in Fig. 3, the circuit for controlling the operation of the valve may comprise a battery B, a conductor 71, a manually operable two-way switch 72, conductors 74 and 75, the microswitch 51 having an arm 73 contacting the conductor 74, the solenoid 36 and a return conductor 76. When the switch 72 contacts the upper conductor 74, the battery will supply current to the solenoid 36 through conductor 71, switch 72, conductor 74, switch 51 and conductor 76. Upon energization of the solenoid, the arm 73 of the microswitch 51 is caused to break contact with the conductor 74 and to make contact with the conductor 75 so that, to energize the solenoid again, the switch 72 must make contact with the conductor 75, whereupon the switch 51 is caused to return to its original position in contact with the conductor 74, as will be described in greater detail hereinafter.

Figure 4:
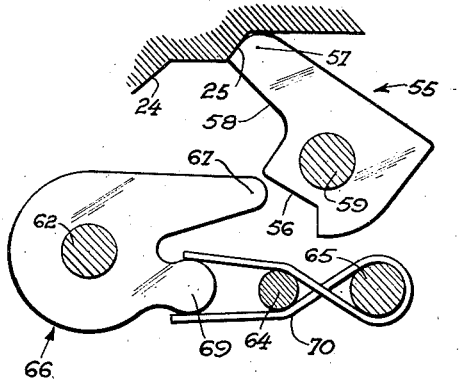
Fig. 4 is a schematic view of the latch element, together with its cooperating elements, including the operating element and the stop means, illustrating their relative positions in the valve operating cycle when the valve is closed.

In Fig. 4 the elements are shown in their respective positions when the valve is closed. The projection 57 of latch element 55 is in engagement with the shoulder 25 and the latch operating element 66 is shown retained in its normal position by the action of the two-way spring 70 on the toe portion 69 thereof.

Figure 5:
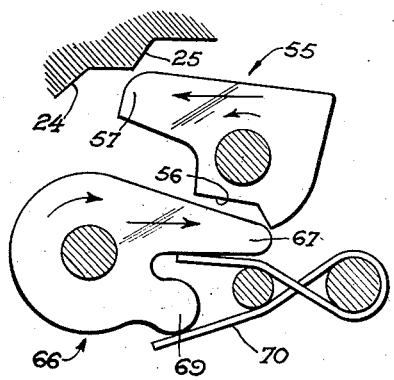
Figs. 5, 6 and 7 are views similar to Fig. 4, illustrating the same elements in sequential positions of the valve operating cycle.

In operation, to open the valve, the solenoid is energized, whereupon the rod 31, which is connected through the stem 35 to the solenoid armature (not shown), will slide in the plunger slot 30 in a direction towards the solenoid, as viewed in Fig. 1. The projection 67 of the pivotally mounted element 66 will engage the cam surface 56 of the latch element 55, causing that element to pivot on pin 59 until the projection 57 is no longer engaged by the shoulder 25. For example, as shown in Fig. 5, the latch operating element 66 is drawn in the direction indicated and the projection 67 engages the cam surface 56 of latch element 55, causing that element to pivot in a counterclockwise direction, as indicated, until its projection 57 becomes disengaged from the shoulder 25 and the extremity of projection 67 is drawn past the cam surface 56. The counterclockwise pivotal action of the latch element 55 causes element 66 to pivot in a clockwise direction against the restraining action of the spring 70 on the toe portion 69. The latch element will continue to pivot until the projection 67 is drawn out of engagement with the cam surface 56. At this point of the cycle the plunger is free to move and the spring 37, acting against the disc 34, urges the plunger 29 in a direction away from the solenoid, thereby effecting unseating of the valve member 26.

As the disc travels away from the solenoid under the influence of the spring 37, the flange 39 moves out of contact with the pin 54, permitting the contact arm of switch 51 to open the circuit and to engage its other contact as described heretofore, and to de-energize the solenoid, whereupon a spring (not shown), contained within the solenoid, urges the armature towards its original position, thus moving the rod 31 into its original position with respect to the plunger 29. When this occurs, the projection 57 on the latch element 55 is engaged by the shoulder 24 and is maintained in that position by the force of the spring 37; and the element 66 has moved to the position shown in Fig. 1. At the same time the spring 70, bearing against the toe portion 69, has returned the element 66 to its normal position on the pin 62.

Figure 6:
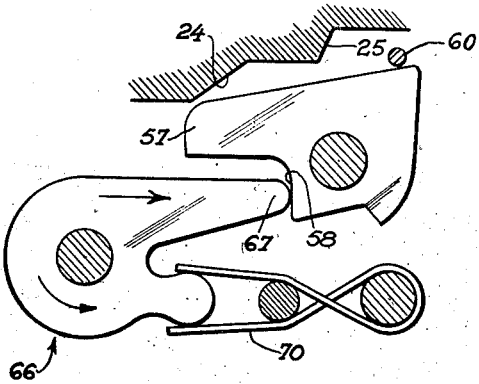

To close the valve, the solenoid is again energized and the armature, the stem 35, rod 31 and latch operating element 66 are again drawn in a direction towards the solenoid. The projection 67 engages the cam surface 58 of latch element 55, as shown in Fig. 6, causing the plunger 29 to move with the rod 31 until the projection 57 of the latch element 55 engages the shoulder 25, at which point the valve member is seated.

Figure 7:
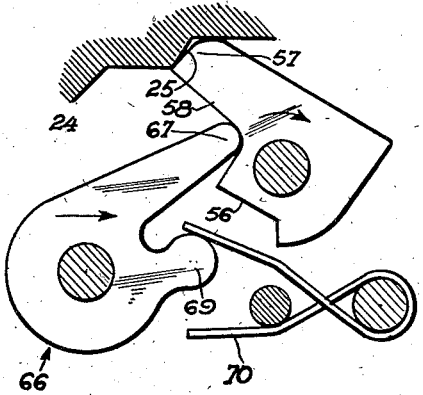

Fig. 7 illustrates the position of the same elements after the valve member is seated, but before the solenoid is de-energized. The action of the projection 67 on the cam surface 58 has caused the latch element to pivot in a clockwise direction while moving it linearly in the direction indicated until the projection 57 engages the shoulder 25. As this position is reached, the solenoid is de-energized, the armature spring urges the rod 31 in a direction towards the valve seat, and the spring 70 bearing downwardly on the toe portion of the valve operating element causes that element to return to the position illustrated in Fig. 4.

As the disc 34 travels towards the solenoid against the influence of the spring 37, the flange 39 moves into contact with the pin 54 causing it to ride upward in the aperture 52 to open the switch 51, as described heretofore, thereby de-energizing the solenoid, whereupon the armature spring (not shown), contained within the solenoid, urges the armature towards its original position, thus moving the rod 31 into its original position with respect to the plunger 29.

To unseat the valve member, the solenoid is again energized, whereupon the element 66 begins to move in the direction indicated until the projection 57 is drawn out of engagement with the shoulder 25, as described heretofore.

From the foregoing description, it will be seen that the present invention provides a simple, reliable, balanced valve of the character indicated herein, which is quick acting and which automatically locks itself in the opened or closed position. The time required to open or close valves made in accordance with the present invention has been measured as .015 second. It will also be seen that the valve of the present invention requires very little power for its operation, since the solenoid is energized only momentarily to effect operation thereof to open or close the valve, and that in the event of a power failure, the valve will not change its position. The apparatus has great utility in a wide variety of applications of great importance in the marine, aircraft and industrial fields.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A valve comprising a body having a bore, an inlet, an outlet, and a valve seat between said inlet and said outlet; a valve member positioned in said body for engaging said seat; a plunger slidably disposed in said bore and connected to said valve member and having a slot therein; means for moving said plunger to effect movement of said valve member with respect to its seat; stop means in said bore; an element movably mounted on said plunger and constructed and arranged for engaging said stop means to lock said plunger in a predetermined position; actuating means including a member slidably mounted in said slot; and means carried by said last mentioned member for operating said element to engage and disengage said stop means.

2. A valve comprising a body having a bore, an inlet and an outlet, and a valve seat between said inlet and said outlet; a valve member positioned in said body for engaging said seat; a plunger slidably disposed in said bore and connected to said valve member and having an axially extending slot therein; means for urging said plunger in a direction to effect unseating of said valve member; stop means in said bore; an element pivotally mounted on said plunger and constructed and arranged for engaging said stop means to lock said plunger in a predetermined position; actuating means including a member slidably mounted in said slot; and means carried by said last mentioned member for operating said element to engage and disengage said stop means.

3. A valve comprising a body having a bore, an inlet and an outlet, and a valve seat between said inlet and said outlet; a valve member positioned in said body for engaging said seat; a plunger slidably disposed in said bore and connected to said valve member and having an axially extending slot therein; means for urging said plunger in a direction to effect unseating of said valve member; a pair of stops in said bore; an element pivotally mounted on said plunger and constructed and arranged for engaging each of said stops individually to lock said plunger in predetermined positions respectively; actuating means including a member slidably mounted in said slot; and means carried by said last mentioned member for operating said element to engage and disengage said stops.

4. A valve comprising a body having a bore, an inlet and an outlet, and a valve seat between said inlet and said outlet; a valve member positioned in said body for engaging said seat; means formed with a pair of shoulders mounted in said bore; a plunger slidably disposed in said bore and connected to said valve member and having an axially extending slot therein; means for urging said plunger in a direction to effect unseating of said valve member; an element pivotally mounted on said plunger and constructed and arranged for engaging each of said shoulders individually to lock said plunger in one of two predetermined positions respectively; actuating means including a member slidably mounted in said slot; and means carried by said last mentioned member for operating said element to engage and disengage said shoulders.

5. A valve comprising a body having a bore, an inlet and an outlet, and a valve seat between said inlet and said outlet; a valve member positioned in said body for engaging said seat; a plunger slidably disposed in said bore and connected to said valve member and having an axially extending slot therein; means for urging said plunger in a direction to effect unseating of said valve member; stop means in said bore; an element pivotally mounted on said plunger and constructed and arranged for engaging said stop means to lock said plunger in a predetermined position and having a pair of cam surfaces; actuating means including a member slidably mounted in said slot; and means carried by said last mentioned member for engaging said cam surfaces to operate said element to engage and disengage said stop means.

6. A valve comprising a body having a bore, an inlet and an outlet, and a valve seat between said inlet and said outlet; a valve member positioned in said body for engaging said seat; a plunger slidably disposed in said bore and connected to said valve member and having an axially extending slot therein; means for urging said plunger in a direction to effect unseating of said valve member; stop means in said bore; an element pivotally mounted on said plunger and constructed and arranged for engaging said stop means to lock said plunger in a predetermined position and having a pair of cam surfaces; actuating means including a member slidably mounted in said slot; and means pivotally mounted on said last mentioned member having a projection constructed and arranged to engage said cam surfaces to operate said element to engage and disengage said stop means.

7. A valve comprising a body having a bore, an inlet and an outlet, and a valve seat between said inlet and said outlet; a valve member positioned in said body for engaging said seat; a ring formed with a pair of shoulders mounted in said bore; a plunger slidably disposed in said bore and connected to said valve member and having an axially extending slot therein; a spring for urging said plunger in a direction to effect unseating of said valve member; a latch element pivotally mounted on said plunger having a projection and constructed and arranged for engaging each of said shoulders individually to lock said plunger in predetermined positions respectively and having a pair of cam surfaces; actuating means including a member slidably mounted in said slot; a latch operating element pivotally mounted on said last mentioned member having a projection constructed and arranged to engage said cam surfaces to cause said latch element to engage and disengage said shoulders and having a second projection; and a spring carried by said last mentioned member and in engagement with said second projection to restrain pivotal movement of said latch operating element.

8. A valve according to claim 7, wherein said actuating means include a solenoid mounted on said valve body having an armature connected to said slidably mounted member for effecting movement thereof.

9. A valve comprising a body having a bore, an inlet and outlet, and a valve seat between said inlet and said outlet; a valve member positioned in said body for engaging said seat; a plunger slidably disposed in said bore and connected to said valve member and having an axially extending slot therein; means for urging said plunger in a direction to effect unseating of said valve member; stop means in said bore; an element having cam surfaces pivotally mounted on said plunger and constructed and arranged for engaging said stop means to lock said plunger in a predetermined position; actuating means including a rod slidably mounted in said plunger slot and formed with a slot; and means pivotally mounted in said rod slot having a projection for engaging said surfaces to operate said element to engage and disengage said stop means.

10. A valve comprising a body having a bore, an inlet and an outlet, and a valve seat between said inlet and said outlet; a valve member positioned in said body for engaging said seat; a plunger slidably disposed in said bore and connected to said valve member and having an axially extending slot therein; means for urging said plunger in a direction to effect unseating of said valve member; stop means in said bore; an element pivotally mounted on said plunger and constructed and arranged for engaging said stop means to lock said plunger in a predetermined position; a rod slidably mounted in said slot; means carried by said rod for operating said element to engage and disengage said stop means; and power actuated means for effecting axial movement of said rod to cause said means carried by said rod to engage and operate said element.

11. In combination, a valve comprising a body having a bore, an inlet and an outlet, and a valve seat between said inlet and said outlet; a valve member positioned in said body for engaging said seat; a plunger slidably disposed in said bore and connected to said valve member and having an axially extending slot therein; spring means for urging said plunger in a direction to effect unseating of said valve member; stop means in said bore; an element pivotally mounted on said plunger and constructed and arranged for engaging said stop means to lock said plunger in a predetermined position; a rod slidably mounted in said slot; means carried by said rod for operating said element to engage and disengage said stop means; and operating means including electromagnetic means for effecting axial movement of said rod means to cause said means carried by said rod to engage and operate said element; and a circuit for said electromagnetic means including a source of current, switch means, and circuit opening means associated with said valve for opening said circuit upon movement of said plunger.

12. In combination, a valve comprising a body having a bore, an inlet and an outlet, and a valve seat between said inlet and said outlet; a valve member positioned in said body for engaging said seat; a plunger slidably disposed in said bore and connected to said valve member and having an axially extending slot therein; an extension on said plunger; spring means for urging said plunger in a direction to effect unseating of said valve member; stop means in said bore; an element pivotally mounted on said plunger and constructed and arranged for engaging said stop means to lock said plunger in a predetermined position; a rod slidably mounted in said slot; means carried by said rod for operating said element to engage and disengage said stop means; disc means abutting said plunger and adapted for movement therewith having an annular flange; and operating means mounted on said valve body including electromagnetic means having an armature connected to said rod for effecting axial movement thereof to cause said means carried by said rod means to engage and operate said element; and a circuit for said electromagnetic means including a source of current in said circuit, switch means, circuit opening means associated with said valve, and means mounted in said valve body adapted to be actuated by said annular flange upon movement of said plunger to operate said circuit opening means.

13. In combination, a valve comprising a body having a bore, an inlet and an outlet, and a valve seat between said inlet and said outlet; a valve member positioned in said body for engaging said seat; stop means formed with a pair of shoulders mounted in said bore; a plunger slidably disposed in said bore and connected at one end to said valve member and having an axially extending slot therein; a flange on the other end of said plunger; spring means engaging said flange for urging said plunger in a direction to effect unseating of said valve member; an element pivotally mounted on said plunger and constructed and arranged for engaging each of said shoulders individually to lock said plunger in predetermined positions respectively and having a pair of cam surfaces; a rod having a slot slidably mounted in said first mentioned slot; means pivotally mounted in said rod slot for operating said element to engage and disengage said stop means; and operating means mounted on said valve body including electromagnetic means having an armature connected to said rod for effecting axial movement thereof to cause said means carried by said rod to engage and operate said element; and a circuit for said electromagnetic means including a source of current, switch means, circuit opening means mounted on said valve body, and means mounted in said valve body and adapted to be actuated by said flange upon movement of said plunger to operate said circuit opening means.

References Cited in the file of this patent
UNITED STATES PATENTS

| | | |
|---|---|---|
| 570,455 | Coleman | Nov. 3, 1896 |
| 687,895 | Millea | Dec. 3, 1901 |
| 1,772,443 | Eggleston | Aug. 5, 1930 |
| 2,304,844 | Parker | Dec. 15, 1942 |
| 2,551,445 | Lindsay | May 1, 1951 |
| 2,556,675 | Carnagua | June 12, 1951 |